(12) United States Patent
Rothschild et al.

(10) Patent No.: US 11,770,412 B2
(45) Date of Patent: Sep. 26, 2023

(54) SECURE PASSWORD LOG IN ON INSECURE DEVICES

(71) Applicant: EMC IP Holding Company LLC, Hopkinton, MA (US)

(72) Inventors: Seth Jacob Rothschild, Cambridge, MA (US); Benjamin Santaus, Medford, MA (US); Orlando Xavier Nieves, Lowell, MA (US); Radia J. Perlman, Redmond, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 302 days.

(21) Appl. No.: 17/161,030

(22) Filed: Jan. 28, 2021

(65) Prior Publication Data

US 2022/0239699 A1 Jul. 28, 2022

(51) Int. Cl.
*H04L 9/40* (2022.01)
*H04L 67/146* (2022.01)

(52) U.S. Cl.
CPC .......... *H04L 63/20* (2013.01); *H04L 63/0428* (2013.01); *H04L 63/083* (2013.01); *H04L 67/146* (2013.01)

(58) Field of Classification Search
CPC ... H04L 63/20; H04L 63/0428; H04L 63/083; H04L 67/146
See application file for complete search history.

(56) References Cited

U.S. PATENT DOCUMENTS

| 2014/0223525 A1* | 8/2014 | Fadida | G06F 21/35 726/6 |
| 2014/0298432 A1* | 10/2014 | Brown | G06F 21/34 726/6 |
| 2014/0317708 A1* | 10/2014 | Adrangi | H04W 12/06 726/7 |
| 2015/0281229 A1* | 10/2015 | Kang | H04L 63/0869 713/185 |

* cited by examiner

*Primary Examiner* — Chau Le
(74) *Attorney, Agent, or Firm* — Workman Nydegger (57) ABSTRACT

One example method includes logging into websites through devices including insecure devices. A logon device may store credentials. The logon device is configured to connect with an insecure device and then communicate with a website for authentication purposes without exposing a user's credentials to the insecure device. After the user is authenticated, the session is transferred to the insecure device.

19 Claims, 5 Drawing Sheets

SECURE PASSWORD LOG IN ON INSECURE DEVICES

FIELD OF THE INVENTION

Embodiments of the present invention generally relate to authentication and to user/device security. More particularly, at least some embodiments of the invention relate to systems, hardware, software, computer-readable media, and methods for authentication operations including secure log in operations on insecure devices.

BACKGROUND

Passwords are a common way for a website or a web server to uniquely identify and grant access to a user. It is often thought that there is a tradeoff between security and ease of use in the sense that easier to use authentication methods are less secure. However, it is possible for authentication methods to be both insecure and hard to use.

For example, some passwords based on rules that require special characters, capital letters, and numbers. Some users are burdened with an additional requirement of being required to frequently change their password. In this scenario, the password becomes harder to use and remember. Users with hard to remember passwords often resort to insecure methods such as paper. This is interesting considering that more security could be obtained by requiring longer passwords without the rules.

Some users rely on multifactor authentication (MFA) or password managers. MFA works by requiring additional evidence before allowing access to an account. Generally, the additional evidence is something you know (e.g., password or PIN), something you have (e.g., security key, phone), or something you are (e.g., biometrics).

MFA, however, has some drawbacks. MFA is typically set up on a site-by-site basis. Further, MFA often requires server-side changes to be implemented by the site maintainer. In other words, MFA (and devices that can check who you are and what you have) require web designers to explicitly build a workflow to accommodate MFA. In addition, the user needs to be able to update their account to identify which factor to use. In addition, users accessing sites without the needed workflow or server-side changes cannot use MFA.

Password managers have various implementations and provide convenience. Generally, a user is required to remember a master password that is used to encrypt the user's other passwords. The stored passwords can be retrieved using the master password.

When a user accesses a website that requires credentials on an insecure device, the user must enter the password into the secure device. This places the password at risk. While password managers provide some security, a user on an insecure device is required to enter their master password into the insecure device in order to access the password manager. Inputting a master password into an insecure device is worse than simply entering a password for a specific site, at least because all of the user's passwords in the password manager may be at risk.

FIDO (Fast Identity Online) promotes authentication standards and is attempting to reduce the reliance on passwords. Even though FIDO supports various authentication technologies including biometrics and hardware keys, some of these technologies have not been widely adopted in part because the server side needs to be adjusted in order to accommodate these factors. Few websites make these adjustments in part because few users have the appropriate devices.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to securing devices and passwords and to security and/or authentication operations. More particularly, at least some embodiments of the invention relate to systems, hardware, software, computer-readable media, and methods for password authentication on insecure devices.

In general, example embodiments of the invention relate to a logon device associated with a user that logs in to a website, an online account, cloud storage (generally referred to herein as website(s)), directly or via an insecure device (e.g., an untrusted device, a device unknown to the user, or other device that may present a security risk). This allows the user to log in without entering credentials (e.g., username and/or password) into the insecure device. The credentials may also be associated with text such as a URL (Uniform Resource Locator). Stated differently, the user's credentials are never stored or present in the memory of the insecure device. As the same time, the user has the benefit, once logged in to the website using the logon device, of accessing the website from an insecure device that may have advantages such as a larger display.

Embodiments of the invention authenticate a user that decides to use an insecure device while reducing the security risk facing the user. In one example, the logon device may pair with the insecure device using a protocol such as Bluetooth or other wireless/wired protocol and, once paired or connected, the logon device logs in to a website. The user may request and approve that the logon device perform these actions. Alternatively, the logon device may notify the user to approve a request to log in to a website if the logon device is able to detect log in attempts or requests occurring on an insecure device. Once the log in is completed, cookies such as session cookies are placed on the logon device during log in and are subsequently transferred to the insecure device. This allows the user continued access to the website from the insecure device without entering or exposing the credentials to the insecure device.

Advantageously, as previously stated, the credentials are never written into the memory of the insecure device. In addition, there is no need to install a password manager on the insecure device, which ensures that the password manager master password and the decrypted credential store of that password manager are not exposed to the insecure device. Plus, server-side changes to websites are not required to implement embodiments of the invention.

Embodiments of the invention improve the mechanics of authenticating users and allow a logon device to programmatically act as a user on or via an insecure device without exposing the credentials to the insecure device. Embodiments of the invention increase the usability and security when logging on to websites that, by way of example only, require credentials such as a username/password pair.

Figure 1:
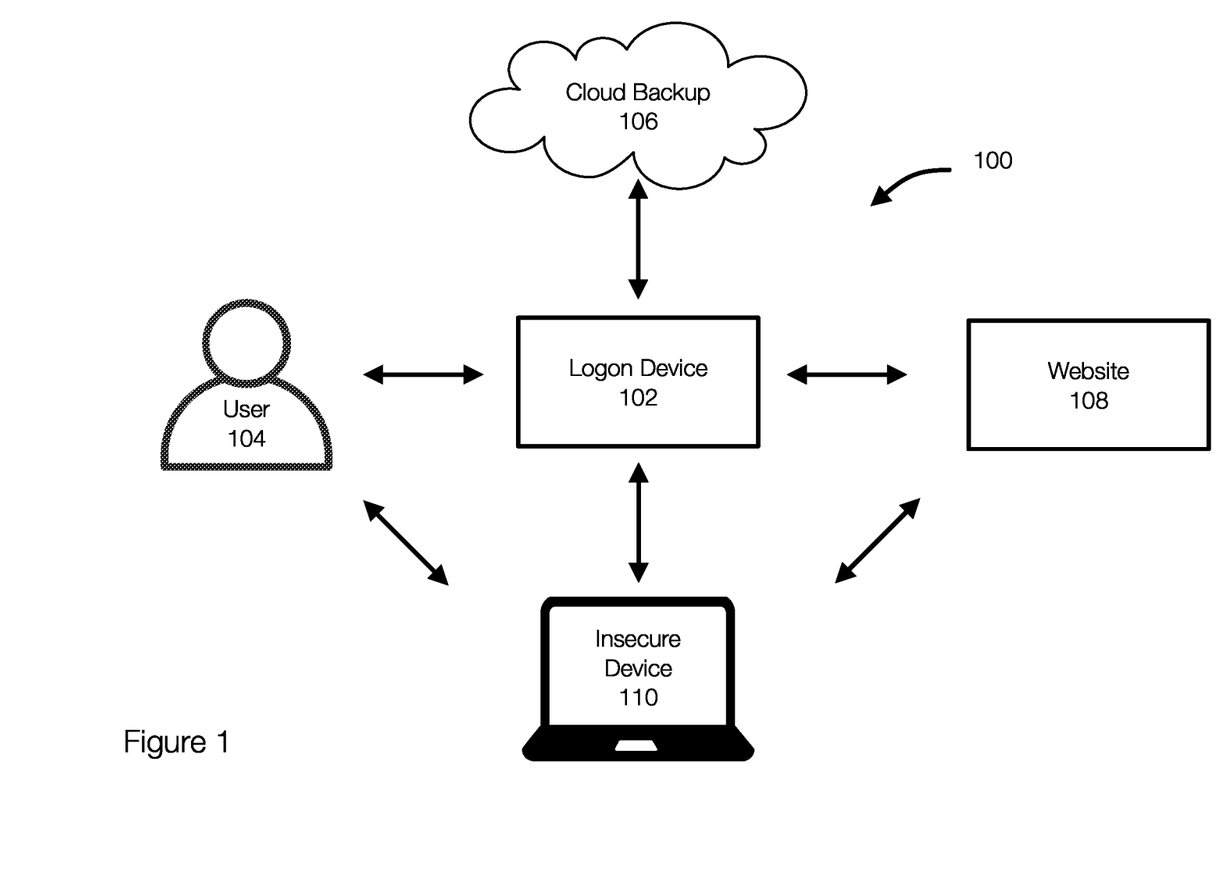
FIG. 1 discloses aspects of communications between logon devices, insecure devices, users, websites, and backups.

FIG. 1 illustrates examples of an environment in which embodiments of the invention may be implemented. The environment 100 may include networks of various kinds including local networks, the Internet, or the like. In FIG. 1, a user 104 may be associated with a logon device 102. The logon device 102 is capable of pairing, connecting, or otherwise communicating with an insecure device 110. Once paired or connected, the logon device 102 can log in to a website 108 securely. Even though the communication between the logon device 102 and the website 108 may occur via the insecure device 110, the communication may be an encrypted communication that is not readable by the insecure device 110.

The logon device 102 may store credentials that can be used to log in to the website 108. Once the user 104 is logged in, the session may be transferred to the insecure device 110 such that the user 104 can browse or access the website 108 using the insecure device 110. A copy of the credentials stored on the logon device 102 may also be present (and encrypted) in the cloud (e.g., in a password manager storage, an online storage account).

Figure 2:
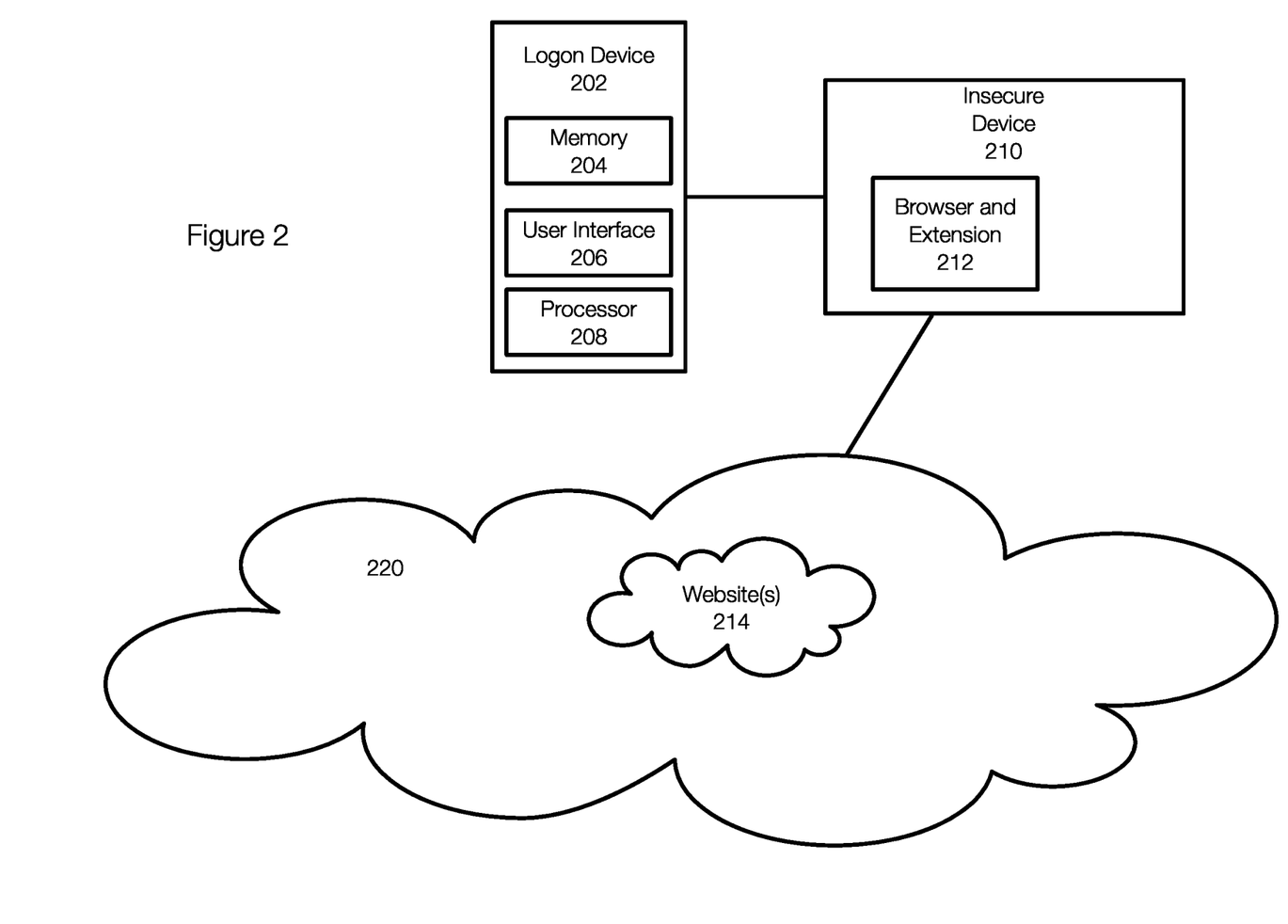
FIG. 2 discloses aspects of a logon device configured for authentication purposes and to allow sites to be accessed with insecure devices without disclosing credentials.

FIG. 2 discloses aspects of a logon device configured to perform authentication operations. FIG. 2 illustrates a logon device 202 (an example of the logon device 102) that is configured to access (i.e., log into) websites 214 in the cloud 220 (the Internet or other network). Embodiments of the invention are discussed with respect to websites 214 but may be applied to other network connected devices/services such as online accounts, storage, compute, or the like.

In this example, the logon device 202 allows a user to log in to a website 214 using, for example, credentials such as a username/password. The logon device 202 can be a single purpose device (e.g., a bluetooth device) and may be a wearable device. The device 202 may include a memory 204, a user interface 206 and may have some processing capability such as a processor 208. The logon device 202 may also include network or wireless communication hardware. Thus, the logon device 202 may be a network connectable device (e.g., WiFi, bluetooth, low power bluetooth) and have the ability to perform cryptographic operations, storage operations, network communications, and the like. The logon device 202 may be rechargeable, replaceable, wearable, or the like.

With network or wireless capabilities (or even wired capabilities if necessary), the logon device 202 may communicate with the insecure device 210. The insecure device 210, by way of example only, any device that the user may want to use to access a website or perform other operations.

The insecure device 210 may not be trusted by the user of the logon device 202, is unknown to the user (e.g., a laptop of another user, a public computer or laptop, or other device). The insecure device 210 may present a security risk. In particular, use of the insecure device 210 alone to access the websites 214 would require the user to enter credentials into the insecure device 210, which may compromise the user's credentials. Although embodiments of the invention are discussed with respect to insecure devices, embodiments of the invention may be used with secure or trusted devices at least because of the possibility that a known or trusted device can be compromised with malware or the like.

Communication between the logon device 202 and the insecure device 210 may be wireless. For example, the logon device 202 may pair with the insecure device 210 using Bluetooth or other wireless/wired communication. The insecure device 210 may also be configured to communicate with the logon device 202 over the wireless connection. This may be achieved, by way of example only, using a browser extension 212, plugin, or other software. Installing the browser extension 212 into the browser may enable communication between the insecure device 210 and the logon device 202. This configuration allows the logon device 202 to be a minimal device that is inexpensive and easily replaceable. In one example, the logon device 202 may be able to communicate over a network including the Internet on its own.

After the logon device 202 is initialized and the extension 212 or other software is installed, the logon device 202 may perform various functions or operations. Once initialized (discussed below with respect to FIG. 3), the logon device 202 may listen for requests to use credentials. For example, a user may browse to a website 214 on the insecure device 210 and the extension 212 may generate a request that is transmitted to the logon device 202. The request may indicate the need for credentials to log in to the website 214. Upon receiving a request, the logon device 202 may notify the user about the request and receive input from the user confirming the request. Once confirmed, the logon device 202 may log in to the website using credentials stored on the logon device 202 and which were set during initialization. The logon device 202 can access the website 214 securely through the insecure device 210 and provide the credentials directly to the website 214. The credentials that pass through the insecure device 210 are encrypted or otherwise protected from being accessed by the insecure device 210. The website can receive the credentials and log the user in to the website 214. The website 214 may provide data (e.g., session cookies) to the logon device 202 during the authentication process.

Once authentication is completed, the logon device 202 may provide the session cookies to the insecure device 210. Once the insecure device 210 has the session cookies, the user can interact with the website 214 using the user interface of the insecure device 210. This process ensures that the credentials are never input to the insecure device 210 while allowing a user to access the website 214 via the browser of the insecure device 210 after the user is authenticated.

Figure 3:
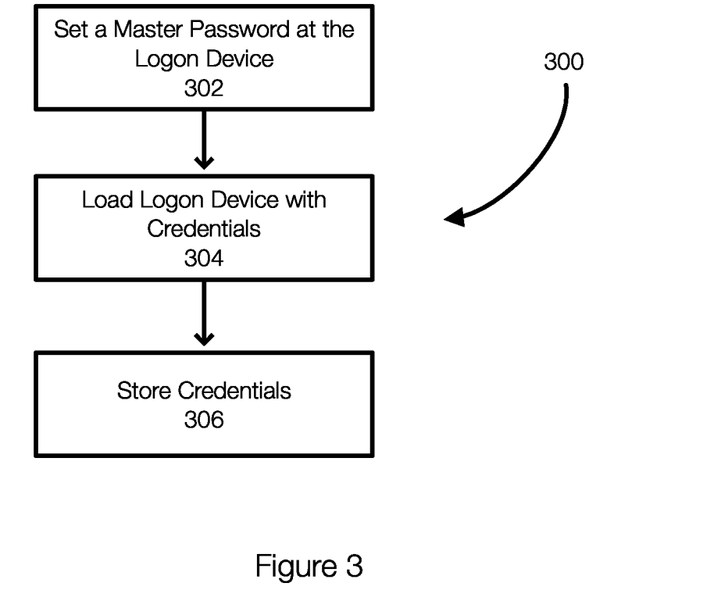
FIG. 3 discloses aspects of a method for initializing a logon device.

FIG. 3 discloses aspects of initializing a logon device. When the logon device is initially acquired or started either for a first time or at a subsequent time, the logon device is initialized 302 with a master password that is set by the user in the method 300. Generally, the master password is required to be entered into the logon device periodically. The master password may be used to encrypt/decrypt credentials that are stored on the logon device.

The master password may be entered or set directly into the logon device by a user. This is achieved via the user interface of the logon device. The user interface may be very simple. For example, the logon device, during initialization, may display a random password and the user accepts the displayed password or changes the master password. For example, a button (physical and/or touch) may allow a user to scroll through alphanumeric characters, type a password or select characters for the password, or the like until the desired master password is set. The master password may then be committed to the logon device. The user interface may be simple but can also have more features. Once set, the master password can be entered into the logon device for various reasons such as to approve a request to use the stored credentials, to verify a user's presence, for security reasons, as a form of MFA, or the like.

Next, the logon device may be loaded 304 with credentials. This may occur one at a time by asking the user to enter the necessary information (e.g., URL, username, password, etc.), or by downloading a copy of the credentials from a storage or service (e.g., online storage, local storage, password manager). This can be achieved by connecting the logon device to a network such as the Internet (even via an insecure device) and downloading the credentials to the logon device. Credentials, when added to the logon device, are stored 306 in the device and may be encrypted with the master password. The credentials, when downloaded to the logon device, may be in an encrypted credential file.

During initialization, the user may determine that simply pushing a button on the logon device is insufficient to determine the user's intent. Additional authentication factors could be required such as a fingerprint scan, sending an authentication code from a phone, or entering the master password into the logon device. This ensures that the logon device is fairly certain that the user wants to perform an operation such as loading the device with the user's credentials or authenticating the user at a specific website.

Figure 4:
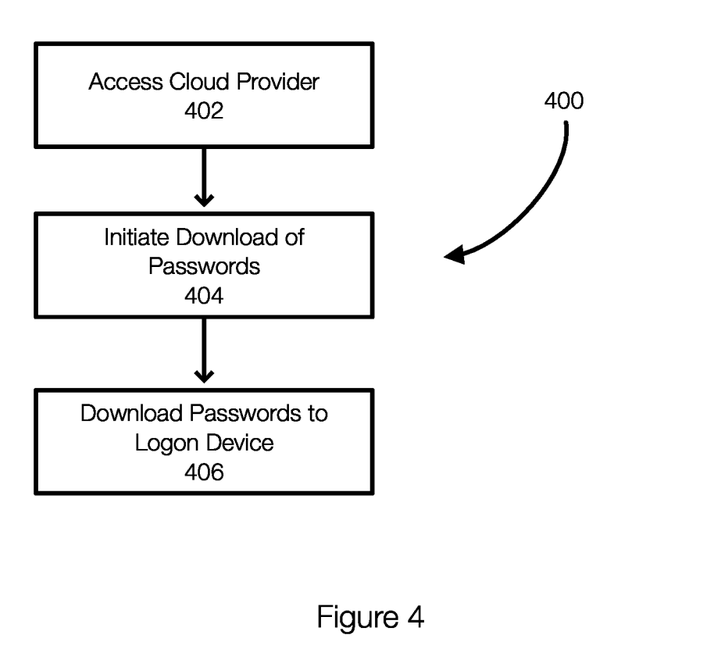
FIG. 4 discloses aspects of backing up and/or downloading credentials to/from a credential store.

FIG. 4 discloses aspects of a method for downloading passwords and/or backing up the logon device. With regard to the logon device, a copy of the user's encrypted credentials (encrypted username/password pairs) should be maintained outside of the logon device. This ensures that the user does not lose access to their accounts in the event the logon device does not function or is lost. To store 306 the credentials in the logon device, an account with a provider (e.g., a password manager), may be used. This ensures that the user's credentials are stored securely in a location other than the logon device. A backup may also be stored in other storage.

To load the logon device with credentials, a user may enter credentials for that specific provider into the logon device and those credentials will be encrypted using the master password of the logon device. Further, the encrypted credentials for the provider storing the passwords is kept separate from the main credential store in the logon device in one example. This is done so that if the user needs to re-download the main credential store from the provider, the user will be able to do so without re-inputting their credentials to the online provider.

When downloading the credentials from a cloud provider in the method 400, for example, the insecure device may be used to browse 402 to the provider's website. A plugin or extension in the browser may be used to indicate that the user would like to move the passwords from the cloud to the logon device. Alternatively, the logon device may be configured to access and download the credentials. The download is thus initiated 404. The logon device confirms, with the user, that the user would like to download the passwords from the website and may prompt the user to enter the master password into the logon device as part of initiating 404 the download.

The plugin or extension allow the logon device to establish a secure tunnel or channel such that the logon device can communicate securely with the website. Once the credentials are entered, the passwords (e.g., encrypted credentials) are accessed and downloaded 406 directly to the logon device and stored at the logon device.

While passwords can be stored in the cloud as a backup for the logon device, an alternate location could be used. Further, the backup may be stored in an offline location or in multiple locations. A user that has a copy of their passwords stored in an local storage device (e.g., offline) and that cannot or does not want to recover their passwords from the cloud may be able to connect to the local storage device and recover their passwords to the logon device from the local storage device.

Figure 5:
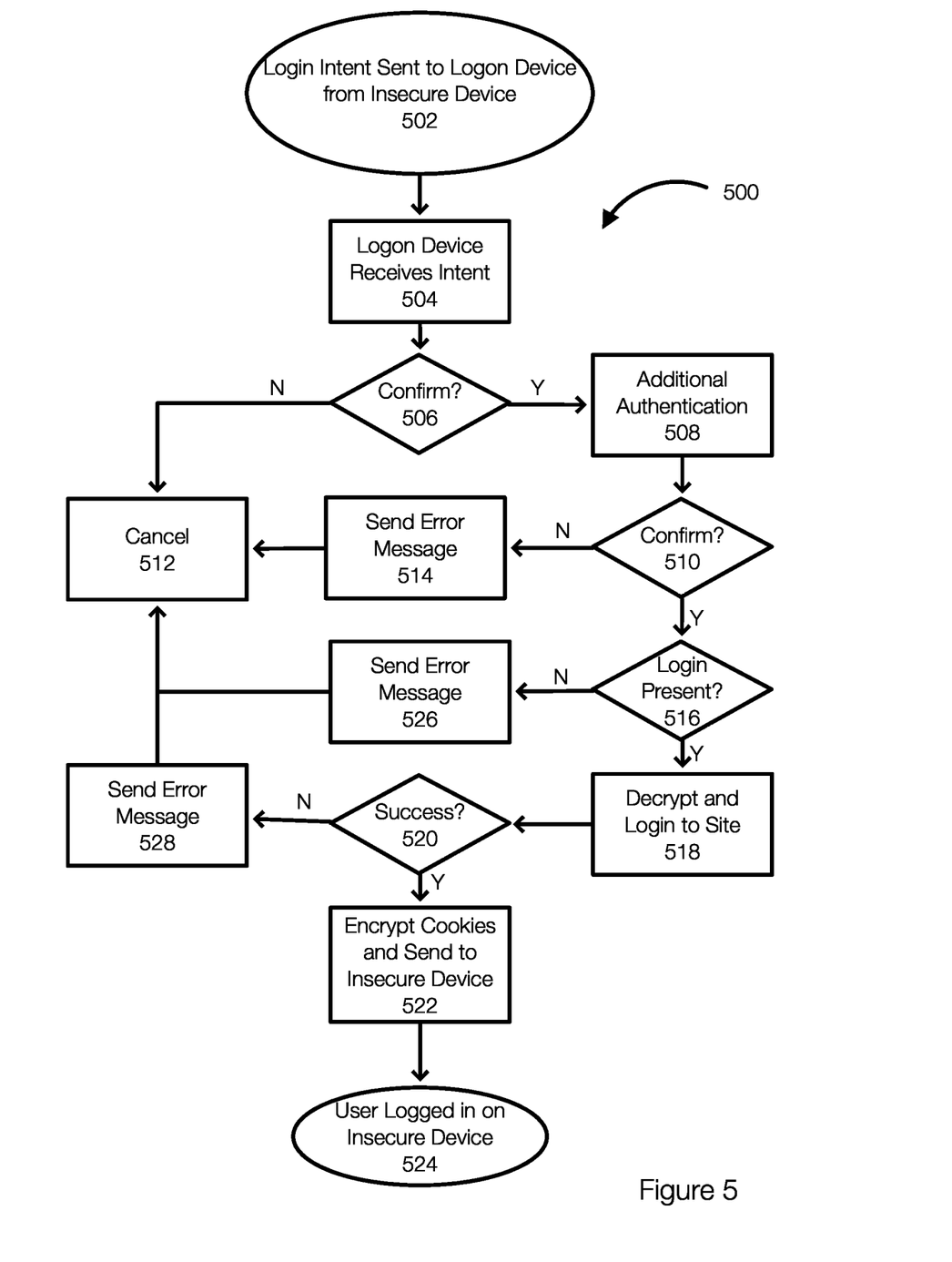
FIG. 5 discloses aspects of a method for authenticating a user with a logon device.

FIG. 5 discloses aspects of a method for authenticating a user. The method assumes that a logon device has securely paired with an insecure device. If pairing by Bluetooth (or other protocol), for example, it is assumed that best practices are performed such that encrypted messages may be sent over the Bluetooth communication and to exclude an unauthorized user or device from pairing with the logon device.

While FIG. 5 discloses an example method for authenticating a user, embodiments of the invention may be performed using different combinations or orders of the elements illustrated in FIG. 5. Some of the elements illustrated in FIG. 5 may be omitted in some embodiments.

The method 500 may begin when a user is using an insecure device. The user may browse to a website (e.g., a banking website) that requires credentials such as a username/password. A plugin or extension or other agent or module may detect the log in attempt or the need to log in and cause the insecure device to send 502 an intent or request to log in to the logon device. The request is an indication that credentials are needed to access a website. The website may be identified in the request. The logon device receives 504 the intent and may prompt the user to confirm 506 the intent to log in. The device may confirm 506 the intent if the user presses a confirm button or provides other affirming input. If the intent to log in is not confirmed at 506, the attempt to log in in cancelled 512.

If desired when the intent to log in is confirmed at 506, additional authentication may optionally be performed 508. For example, MFA may be employed such that the intent is confirmed using another device such as the user's phone. Alternatively, the user may be required to enter the master password into the logon device as a form of MFA that does not require changes at the website being accessed. If the additional authentication is not confirmed (N at 510), an error message may be sent 514 to the user (e.g., to the logon device, to a user's phone) and the attempt is cancelled 512.

If the additional authentication 508 is confirmed (Y at 510), the website address or URL may be evaluated (e.g., parsed) and compared with the stored credentials to determine if log in credentials for the website are present 516 on the logon device. If log in credentials are not present (N at 516), an error message may be sent 526 to the user and the log in attempt is cancelled 512.

If log in credentials are present on the logon device (Y at 516), the credentials (e.g., the password if the username has already been supplied or both the username and the password) are decrypted and presented 518 to the website securely and without being exposed to the insecure device.

This occurs over a secure communication between the logon device and the website, which have a secure tunnel or secure communication channel through the insecure device.

If the credentials are not accepted and the log in attempt is unsuccessful (N at 520), an error message may be sent 528 and the log in attempt is cancelled 512. Of course, more than one attempt may be permitted. If the log in attempt is successful (Y at 520), session cookies may be received by the logon device and stored thereon. Then, the session cookies received from the website reflecting the logged in status are encrypted and sent 522 to the insecure device, which may decrypt and store the session cookies. The user is then logged in 524 to the website on the insecure device. These session cookies are decrypted by the insecure device and allow the insecure device to treat the user as logged in on the insecure device to the website.

Advantageously, neither the password to the website or the master password of the logon device are entered into the insecure device. In some examples, the username may not be entered into or exposed to the insecure device during authentication. The most secret data that is found in the memory of the insecure device is the session cookie(s), which may be the minimum amount necessary to use and access the website from the insecure device. Further, the user does not need to remember the credentials to the website because the credentials are stored on the logon device. The user only needs to have the logon device to access the website. In addition, the website being accessed does not need to make any server side changes to their workflow or operation. At the same time, the security from the user's perspective is increased because the passwords were never entered into or available to the insecure device.

Because server-side changes are not needed, this may facilitate adoption of the invention. Server-side changes, however, are not excluded. Embodiments of the invention can be implemented in different ways to further improve security, some of which may involve server-side changes. For example, websites may build specific interfaces for interacting with a logon device.

Websites may also limit the scope of the session cookies returned to the logon device and used by the insecure device. The cookies may time out faster, only allow access to certain data, or the like. This further limits damage that could be done if the cookies were stolen from the insecure device or if another user begins using the insecure device. Further, the logon device may be configured to use hardware key protocols such as FIDO, by way of example only.

Figure 6:
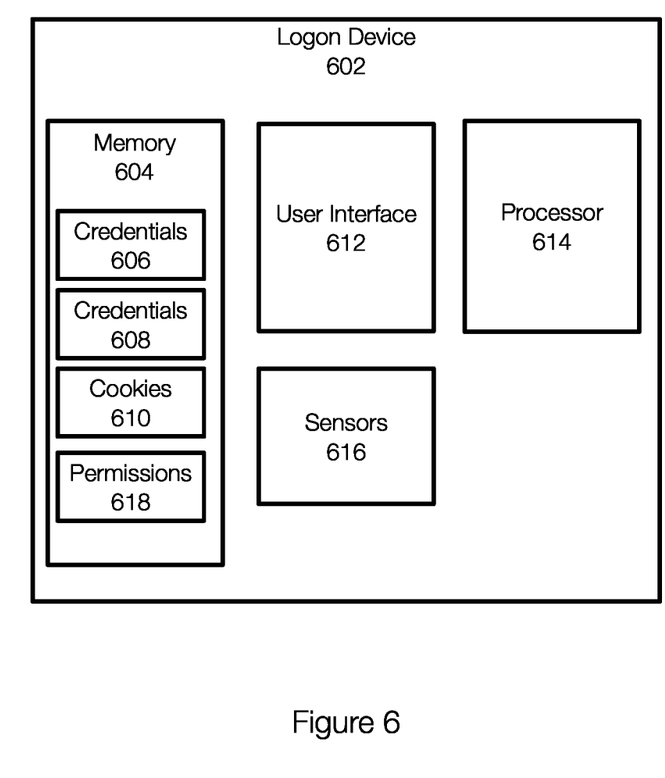
FIG. 6 discloses further aspects of a logon device.

FIG. 6 discloses additional aspects of a logon device. The logon device 602, which is an example of the logon device 102, includes a user interface 612, a processor 614 and other hardware that is sufficient to communicate wirelessly with another device. The memory 604 may store credentials 606. The credentials 606, in this example, may include the credentials of the user for most websites. The credentials 608, which are stored separately from the credentials 606, may include the credentials for a website that also stores a copy of the credentials 606. Other credential stores may also be present.

The logon device 602 may also store cookies 610, at least temporarily. For example, while the logon device 602 authenticates with a website, the data resulting from the authentication may be stored in or represented by the cookies 610. Typically, these cookies are transferred to the insecure device as previously discussed. However, the cookies are not necessarily deleted from the logon device. In one example, the cookies 610 can be tested for validity and, if valid, can be sent to the insecure device if they successfully log in the user. In other words, the cookies 610 may still be valid for a subsequent log in attempt. If the attempt to log on using existing cookies 610 is unsuccessful, the logon device 602 can authenticate as previously described and replace the session cookies with new session cookies.

In one example, the logon device 602 may be actively listening for password requests as a general rule. This could potentially be used by a malicious user who has fraudulently connected to the logon device 602. The malicious user may cause requests to be made (e.g., by accessing a website that needs credentials) and hope that the user accidentally verifies or confirms one of the fraudulent requests. In one example, the always listening feature may be turned off such that the user is required to activate the listening feature (e.g., press a button) to listen for a request for example. While this is an extra step for the user to perform, this may conserve power and may improve security.

In another example, the logon device 602 may be wearable (e.g., a bracelet or a ring). This logon device may include sensors 616 that allow the logon device 602 to detect whether the user is wearing the device. In one example, the logon device 602 is configured to erase the credentials 606, 608, and/or cookies 610 when the logon device 602 is removed. However, this would require the logon device 602 to be reinitialized frequently including, for example, when the device needs to be charged. The erasure process, however, may be optional.

In one example, the logon device 602 may not erase or forget all of the credentials. The URL of a cloud provider that stores a copy of the user's credentials and the credentials for that cloud provider may be retained in encrypted form. When a user needs to reload the logon device 602, the user would only need to enter their master password or provide other authentication.

In another example, the credentials may be provided with different levels of security. For example, some insecure devices may be trusted more than others. Permissions 618 can be set to various insecure devices. For example, the user may determine that, for a certain insecure device, only certain credentials are visible or accessible. The permissions 618 can control which credentials can be accessed by which insecure devices.

In addition, a user may set multiple passwords to access the varying account security levels. Each security level may be associated with a different credential store in the logon device. In one example, a higher security password would enable access to all lower security levels. The lower security password, for example, may be encrypted inside a credential store associated with the higher security password. This allows the lower security levels to be accessed when the higher security password is provided.

In other words, multiple credential stores may be maintained and each may be associated with a different password. For example, one password may be used for the credentials 606 and a different password may be used for the credentials 608. If the credentials 606 are subject to higher security, the password to the credentials 608 may be encrypted and stored in the credentials 606. This gives the higher security password access to both credential stores 606 and 608.

In one example, the logon device may be a single purpose device that does not have any mechanism for downloading new code, which makes it more difficult to compromise. In one embodiment, all transactions may require confirmation from the user. The logon device may be configured such that all password transactions to and from the logon device only happen using short range signals, such as Bluetooth. Using short range signals requires an attacker to be sufficiently close to the logon device and to have paired with the logon device before the attacker could attempt a log in using the credentials stored in the logon device. Even in this example, the user of the device would be alerted and could reject the transaction.

In some embodiments, the credential store is encrypted with a strong password that does not need to be entered anywhere except on the logon device.

By storing memory-based authentication methods like credentials on a logon device, existing authentication methods are used in or combined with a physical authentication. This also avoids server-side changes to websites. Software that allows communication between the insecure device and the logon device and modify cookies in the browser on the insecure device may need to be installed on the insecure device.

The logon device further allows for the use of hardware token protocols in addition in conjunction with authentication methods such as username/passwords.

Because the logon device is a physical device, which may be worn by a user, a trigger can be configured that automatically deletes all of the account information stored on the logon device. However, it would be useful for the data on the logon device to be backed up elsewhere.

The following is a discussion of aspects of example operating environments for various embodiments of the invention. This discussion is not intended to limit the scope of the invention, or the applicability of the embodiments, in any way.

As used herein, the term 'data' is intended to be broad in scope. Thus, that term embraces, by way of example and not limitation, credentials, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted with respect to the example method of Figure(s) XX that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method, comprising: receiving a request, at a logon device, to log in to a website from an insecure device, determining whether the logon device stores credentials for the website in response to the request, logging in to the website, by the logon device using the credentials for the website stored in the logon device, wherein the credentials are never in the clear to the insecure device, and transferring a session between the logon device and the website to the insecure device such that the session continues between the insecure device and the website.

Embodiment 2. The method of embodiment 1, further confirming the request by the logon device.

Embodiment 3. The method of embodiment 1 and/or 2, further comprising confirming the request by receiving input at the device or using authentication factors external to the logon device.

Embodiment 4. The method of embodiment 1, 2, and/or 3, wherein logging in to the website further comprises decrypting the credentials for the website and securely providing the decrypted credentials to the website.

Embodiment 5. The method of embodiment 1, 2, 3, and/or 4, further comprising receiving session cookies from the website.

Embodiment 6. The method of embodiment 1, 2, 3, 4, and/or 5, further comprising transferring the session cookies to the insecure device.

Embodiment 7. The method of embodiment 1, 2, 3, 4, 5, and/or 6, further comprising loading the logon device with credentials of the user including the credentials to the website.

Embodiment 8. The method of embodiment 1, 2, 3, 4, 5, 6, and/or 7, further comprising pairing the logon device with the insecure device.

Embodiment 9. The method of embodiment 1, 2, 3, 4, 5, 6, 7, and/or 8, further comprising setting security levels for credentials stored on the device, wherein each security level is associated with a different password.

Embodiment 10. The method of embodiment 1, 2, 3, 4, 5, 6, 7, 8, and/or 9, further comprising setting permissions for insecure devices including the insecure device.

Embodiment 11. The method of embodiment 1, 2, 3, 4, 5, 6, 7, 8, 9, and/or 10, further comprising erasing the logon device in response to a trigger.

Embodiment 12. The method of embodiment 1, 2, 3, 4, 5, 6, 7, 8, 9, 10, and/or 11, wherein the logon device is wearable.

Embodiment 13. The method of embodiment 1, 2, 3, 4, 5, 6, 7, 8, 9, 10, 11, and/or 12, further comprising rejecting the request when the credentials are not stored in the logon device or when a confirmation of the request is not received.

Embodiment 14. A method for performing any of the operations, methods, or processes, or any portion of any of these or combination thereof, disclosed herein.

Embodiment 15. A non-transitory storage medium having stored therein instructions that are executable by one or more hardware processors to perform operations comprising the operations of any one or more of embodiments 1 through 14.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM of any type, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a request, at a logon device, to log in to a website from a device;
   determining whether the logon device stores credentials for the website in response to the request;
   setting security levels for credentials stored on the logon device, wherein each security level is associated with a different password;
   logging in to the website, by the logon device using the credentials for the website stored in the logon device, wherein the credentials are never in the clear to the device; and
   transferring a session between the logon device and the website to the device such that the session continues between the device and the website.

2. The method of claim 1, further confirming the request by the logon device.

3. The method of claim 2, further comprising confirming the request by receiving input at the device or using authentication factors external to the logon device.

4. The method of claim 1, wherein logging in to the website further comprises decrypting the credentials for the website and securely providing the decrypted credentials to the website.

5. The method of claim 4, further comprising receiving session cookies from the website.

6. The method of claim 5, further comprising transferring the session cookies to the device.

7. The method of claim 1, further comprising loading the logon device with credentials of the user including the credentials to the website.

8. The method of claim 1, further comprising pairing the logon device with the device, wherein the device is an insecure device.

9. The method of claim 1, further comprising setting permissions for other devices including for the device.

10. The method of claim 1, further comprising erasing the logon device in response to a trigger.

11. The method of claim 1, wherein the logon device is wearable.

12. The method of claim 1, further comprising rejecting the request when the credentials are not stored in the logon device or when a confirmation of the request is not received.

13. A non-transitory storage medium having stored therein instructions that are executable by one or more hardware processors to perform operations comprising:
   receiving a request, at a logon device, to log in to a website from a device;
   determining whether the logon device stores credentials for the website in response to the request;

setting security levels for credentials stored on the logon device, wherein each security level is associated with a different password;

logging in to the website, by the logon device using the credentials for the website stored in the logon device, wherein the credentials are never in the clear to the device; and transferring a session between the logon device and the website to the device such that the session continues between the device and the website.

14. The non-transitory storage medium of claim 13, further confirming the request by the logon device.

15. The non-transitory storage medium of claim 14, further comprising confirming the request by receiving input at the device or using authentication factors external to the logon device.

16. The non-transitory storage medium of claim 13, wherein logging in to the website further comprises decrypting the credentials for the website and securely providing the decrypted credentials to the website, receiving session cookies from the website, and transferring the session cookies to the device.

17. The non-transitory storage medium of claim 13, further comprising loading the logon device with credentials of the user including the credentials to the website.

18. The non-transitory storage medium of claim 13, further comprising:
   pairing the logon device with the device;
   setting permissions for multiple devices including the device; and/or
   erasing the logon device in response to a trigger.

19. The non-transitory storage medium of claim 13, further comprising rejecting the request when the credentials are not stored in the logon device or when a confirmation of the request is not received.

* * * * *